(12) United States Patent
Hamatake et al.

(10) Patent No.: US 7,769,200 B2
(45) Date of Patent: Aug. 3, 2010

(54) METHOD, APPARATUS, AND COMPUTER PRODUCT FOR EMBEDDING AN ELECTRONIC WATERMARK INTO IMAGE DATA

(75) Inventors: Masafumi Hamatake, Kanagawa (JP); Yoko Sugiura, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 703 days.

(21) Appl. No.: 11/223,033

(22) Filed: Sep. 12, 2005

(65) Prior Publication Data

US 2006/0078159 A1    Apr. 13, 2006

(30) Foreign Application Priority Data

Sep. 24, 2004  (JP)  ............................. 2004-277964
Jul. 7, 2005   (JP)  ............................. 2005-199081

(51) Int. Cl.
    *G06K 9/00*    (2006.01)
(52) U.S. Cl. ................................... 382/100
(58) Field of Classification Search ................ 382/100, 382/173, 176, 177, 181, 182, 183, 232–253; 380/200–242; 358/426.01–426.16
    See application file for complete search history.

(56) References Cited

U.S. PATENT DOCUMENTS

| | | | | |
|---|---|---|---|---|
| 6,628,417 | B1 * | 9/2003 | Naito et al. | 358/1.15 |
| 6,640,304 | B2 * | 10/2003 | Ginter et al. | 713/193 |
| 6,674,874 | B1 * | 1/2004 | Yoshida et al. | 382/100 |
| 2002/0049614 | A1 * | 4/2002 | Rice et al. | 705/3 |
| 2003/0133591 | A1 * | 7/2003 | Watanabe et al. | 382/100 |
| 2003/0210803 | A1 * | 11/2003 | Kaneda et al. | 382/100 |
| 2005/0100671 | A1 * | 5/2005 | Kawada et al. | 427/256 |

FOREIGN PATENT DOCUMENTS

JP    2003-204429    7/2003

* cited by examiner

*Primary Examiner*—Samir A. Ahmed
*Assistant Examiner*—Atiba O Fitzpatrick
(74) *Attorney, Agent, or Firm*—Harness, Dickey & Pierce, P.L.C.

(57) ABSTRACT

In an apparatus for embedding an electronic watermark, a determining unit determines whether a specified area that is specified is present in image data. A text/non-text detecting unit detects a text area and a non-text area in the image. The specified area is at least one of the text area and the non-text area as an area. The embedding unit embeds an electronic watermark into the specified area.

19 Claims, 12 Drawing Sheets

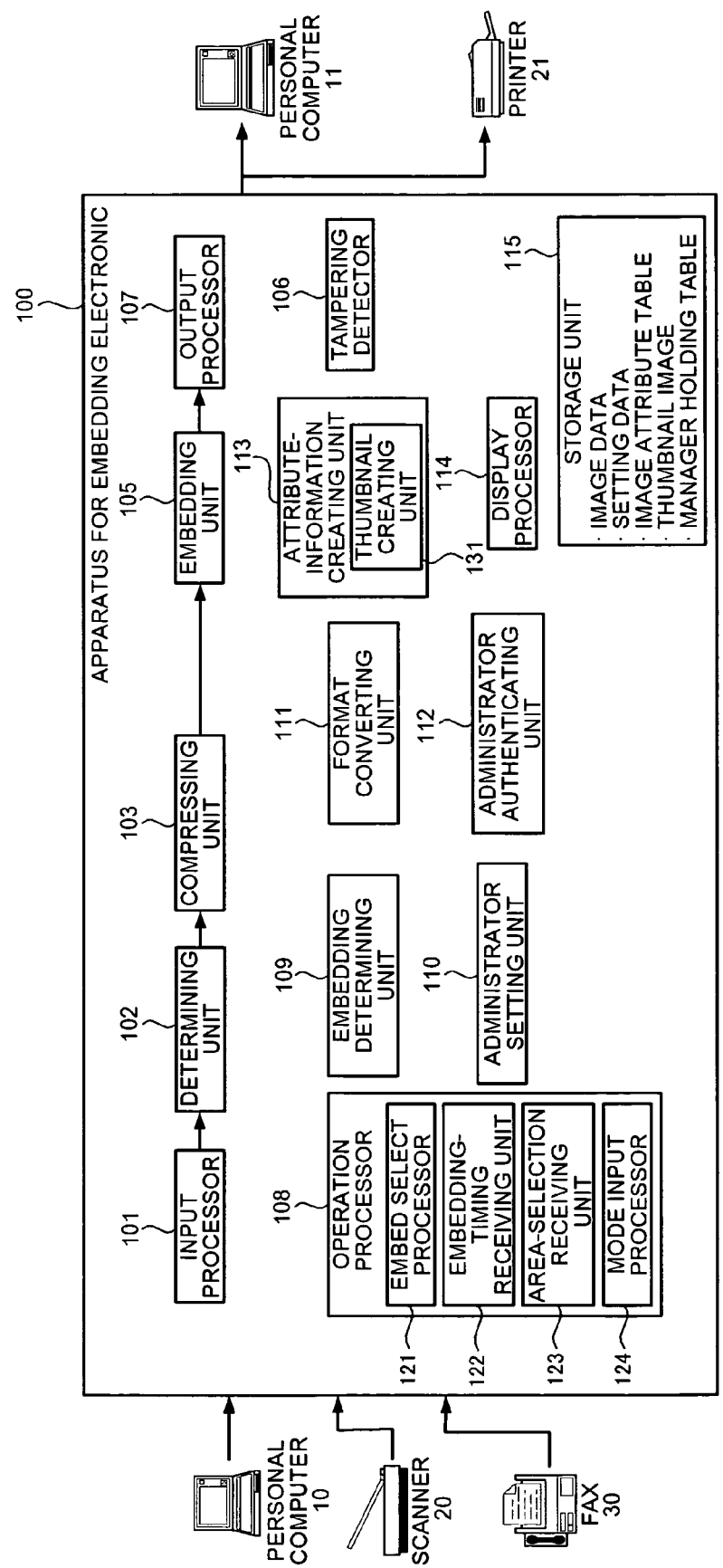

FIG.2

| FILE NAME | THUMBNAIL NAME | DATA TYPE | WATERMARK EMBEDDING | APPLICATION RANGE | WATERMARK OUTPUT | CREATED DATE |
|---|---|---|---|---|---|---|
| document_01 | document_sam_01 | 1 | 1 | 3 | 2 | 09/01/2004/13:00:53 |
| document_02 | document_sam_02 | 2 | 0 | 1 | 0 | 09/02/2004/14:12:54 |
| document_03 | document_sam_03 | 3 | 0 | – | 1 | 09/11/2004/09:31:45 |

WATERMARK EMBEDDING
0 ··· WITHOUT EMBEDDING
1 ··· WITH EMBEDDING

WATERMARK OUTPUT
0 ··· OUTPUT EMBEDDING ELECTRONIC WATERMARK
1 ··· OUTPUT WITHOUT EMBEDDING ELECTRONIC WATERMARK
2 ··· ELECTRONIC WATERMARK ALREADY EMBEDDED

DATA TYPE
1 ··· COPY DATA
2 ··· PRINT DATA
3 ··· SCAN DATA
4 ··· FAX DATA

APPLICATION RANGE
1 ··· ALL
2 ··· OTHER THAN TEXT
3 ··· TEXT (ALL)
4 ··· TEXT (BLACK)
5 ··· TEXT (OTHER THAN BLACK)

FIG. 6

| LIST OF STORED DATA | | | | |
|---|---|---|---|---|
| FILE NAME | DATA TYPE | ELECTRONIC WATERMARK | APPLICATION RANGE | ELECTRONIC WATERMARK OUTPUT |
| document_01 | COPY DATA | YES | TEXT (ALL) | - |
| document_02 | PRINT DATA | NO | ALL | OUTPUT WITH WATERMARK |
| document_03 | SCAN DATA | NO | - | OUTPUT WITHOUT WATERMARK |

COPY
DOCUMENT BOX
FAX
PRINTER
SCANNER

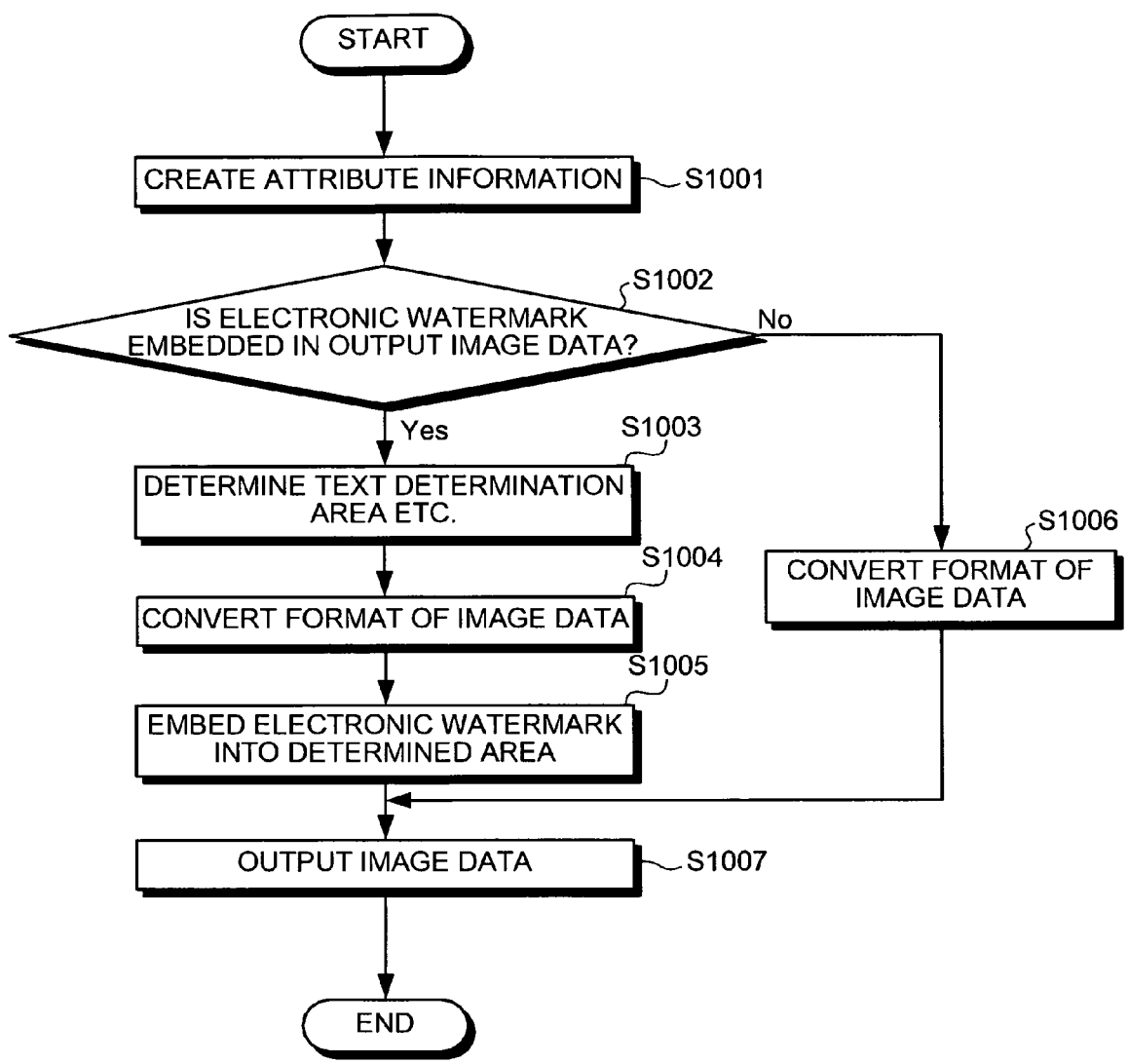

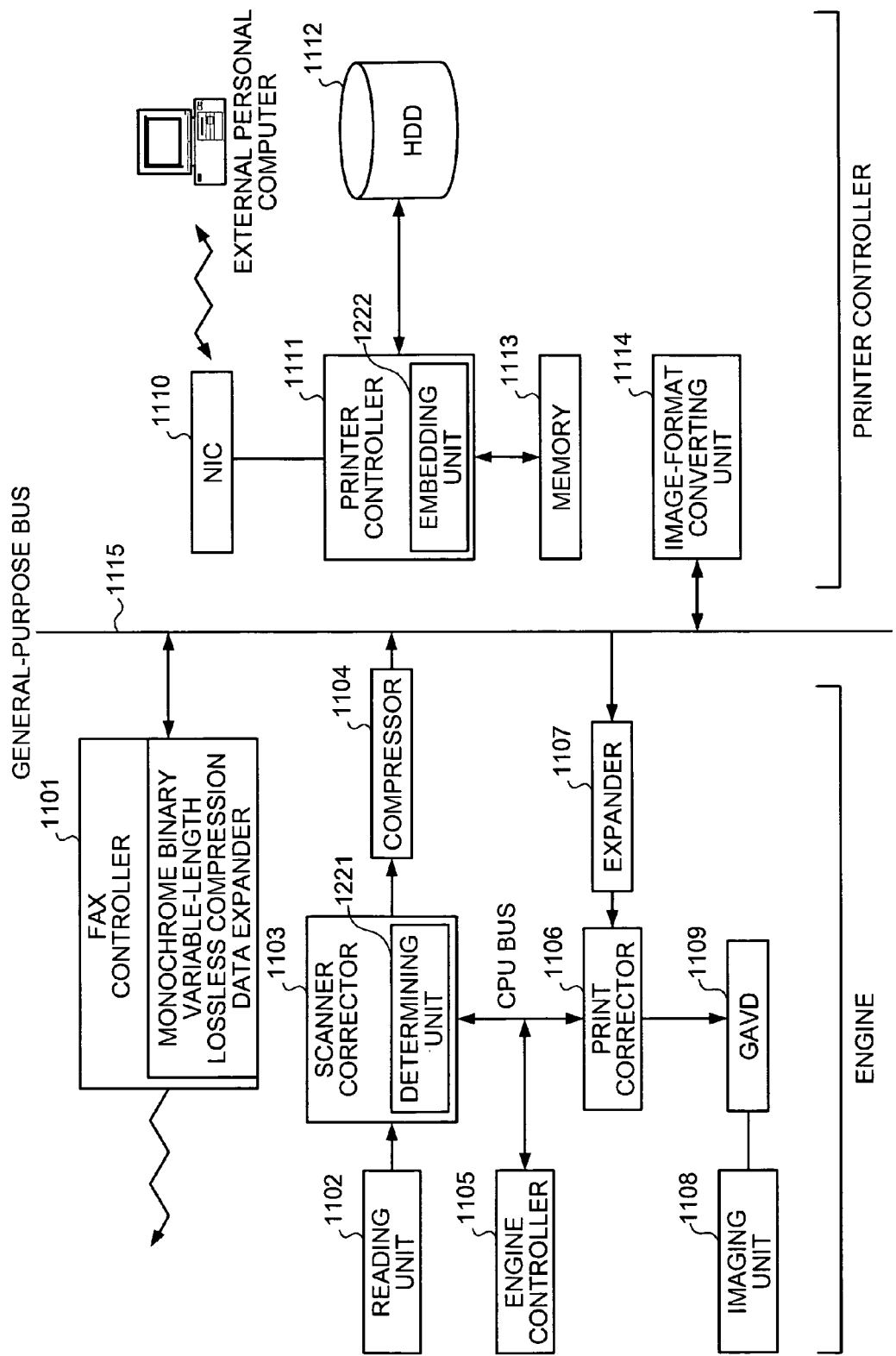

METHOD, APPARATUS, AND COMPUTER PRODUCT FOR EMBEDDING AN ELECTRONIC WATERMARK INTO IMAGE DATA

CROSS-REFERENCE TO RELATED APPLICATIONS

The present document incorporates by reference the entire contents of Japanese priority documents, 2004-277964 filed in Japan on Sep. 24, 2004, and 2005-199081 filed in Japan on Jul. 7, 2005.

BACKGROUND OF THE INVENTION

1. Field of the Invention

The present invention relates to a technology for embedding an electronic watermark in image data.

2. Description of the Related Art

Along with development of information networks, it has become easy to obtain electronic information created by other people. Accordingly, problems such as tampering with copyrighted electronic information without notice to an author have arisen. In order to prevent or restrict the tampering, an electronic watermark technology is calling attention.

There are many proposals for technologies for detecting tampering using an electronic watermark into image data. For example, Japanese Patent Application Laid-open No. 2003-204429 discloses a technique of detecting tampering of an image in which an electronic watermark is embedded, irrespective of the image being compressed or non-compressed.

According to the above technique, an electronic watermark is embedded into all areas of image data to detect tampering. However, it is not always necessary to detect tampering in all areas of the image data. In other words, if an electronic watermark is embedded into all areas, even when a change is made in a part of the image data that has no problem with being changed, the image data is determined as "tampered".

For example, in image data indicating a price for advertisement, a change in a picture in the image data does not cause a problem as long as a change in text in the image data indicating the price is prevented. This is because even when the picture is changed, the image data is still effective in advertising as long as the price is displayed correctly. In this case, transmission and reception of the image data through network is considered to have no practical problem. However, when displayed amount of the price is changed, it should be detected as tampering and be treated properly.

In this example, even when the picture is changed, the image data is still effective in advertising as long as the price is correct. Therefore, even when the picture in the image data is changed, right holders of the image data may wish to spread the image data through the network, rather than detecting the image data as "tampered" to limit spread of the image data. If the image data is detected as "tampered", transmission and reception of the image data can be limited. This stops extensive transmission of the image data, even though a change made is allowable, thereby hindering an advertising effect.

SUMMARY OF THE INVENTION

It is an object of the present invention to at least solve the above problems in the conventional technology.

An apparatus for embedding an electronic watermark according to one aspect of the present invention includes a determining unit configured to determine whether a specified area is present in an image; and an embedding unit configured to embed an electronic watermark into the specified area.

A method of embedding an electronic watermark according to another aspect of the present invention includes determining whether a specified area is present in an image; and embedding an electronic watermark into the specified area.

A computer-readable recording medium according to still another aspect of the present invention is configured to store a computer program for realizing a method of embedding an electronic watermark according to the above aspect.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 1 is a block diagram of an apparatus for embedding an electronic watermark according to a first embodiment of the present invention;

FIG. 2 is a schematic of an image attribute table;

FIG. 6 is a schematic of a screen displayed when a user operates to output image data stored in a storage unit in the apparatus shown in FIG. 1;

FIG. 10 is a flowchart of a process for outputting image data stored in the storage unit; and FIG. 11 is a block diagram of a hardware configuration of the apparatus shown in FIG. 1.

DETAILED DESCRIPTION OF THE PREFERRED EMBODIMENTS

Figure 3A:
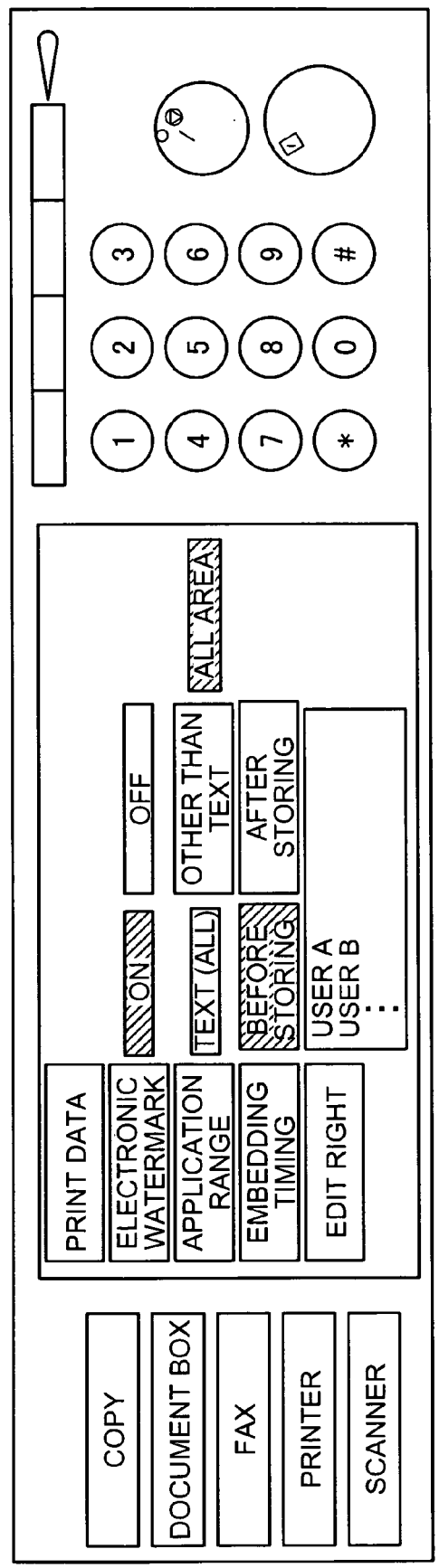
FIG. 3A is a schematic of a screen to input image data from a personal computer.

Exemplary embodiments of the present invention will be explained below in detail with reference to the accompanying drawings.

FIG. 1 is a block diagram of an apparatus for embedding an electronic watermark according to a first embodiment of the present invention. As shown in FIG. 1, an apparatus for embedding an electronic watermark 100 includes an input processor 101, a determining unit 102, a compressing unit 103, an embedding unit 105, a tampering detector 106, an output processor 107, an operation processor 108, an embedding determining unit 109, an administrator setting unit 110, a format converting unit 111, an administrator authenticating unit 112, an attribute-information creating unit 113, a display processor 114, and a storage unit 115. The apparatus 100 embeds, when necessary, an electronic watermark into image data that is input from a personal computer 10 or a scanner 20, and outputs the image data stored in the storage unit 115 embedding the electronic watermark into the image data as necessary.

The image data includes print data, copy data, scan data, and facsimile (FAX) data. The print data includes image data in a format of joint photographic experts group (JPEG) or basic multilingual plane (BMP) input from the personal computer 10. The print data also includes data having a text expression format in font data, such as portable document format (PDF) data. The storage unit 115 also stores setting data, a thumbnail image, and an administrator holding table. The setting data is used to input image data. For example, the setting data includes information on whether an electronic watermark is embedded, an application range in which the electronic watermark is embedded, an application mode in which the image data is input, and an embedding timing at which the electronic watermark is embedded. The administrator holding table includes information on a user identification (ID) indicating an administrator and a password that are associated with each other.

FIG. 2 is a schematic of the image attribute table. As shown in FIG. 2, the image attribute table includes attribute data of image data associating with each other. In the present embodiment, the image attribute table includes information on a file name, a thumbnail name, a data type, a watermark embedding, an application range, a watermark output, and a created date. The image attribute table also corresponds to image attribute information. The embedding unit 105 refers to the "watermark embedding" field in the image attribute table, thereby confirming whether an electronic watermark is embedded in the image data.

The "watermark output" field in the image attribute table includes information on whether an electronic watermark is to be embedded into image data at the time of outputting the image data. When the image data is to be output, the apparatus 100 determines, by referring to this filed, whether the electronic watermark is to be embedded. If a value in this field is "0", that is, when it is set that the electronic watermark is to be embedded into the image data at the time of outputting the image data, the embedding unit 105 embeds the electronic watermark into the image data, and then outputs the image data. With this arrangement, even when a format exchange is to be carried out at the time of outputting the image data, the electronic watermark can be embedded into the image data. For example, when image data in a format that the personal computer cannot directly recognize, such as scan data, is output to the personal computer 11, the embedding unit 105 converts the data into a format such as the BMP format that the personal computer 11 can refer to, embeds the electronic watermark into the image data converted, and then outputs the image data. Thus, a leakage of information can be prevented and tampering can be detected effectively while improving convenience. In addition, a size of the image data is compressed, thereby reducing a load on a communication line.

Referring back to FIG. 1, the display processor 114 displays, on a touch panel, information for the administrator to select whether an electronic watermark is to be embedded into image data at the time of inputting the image data, an application range of an area into which an electronic watermark is to be embedded, an application mode of inputting document data, and embedding timing of an electronic watermark. In the present embodiment, the administrator refers to a user that is authorized to make these selections. At the time of outputting image data, the display processor 114 displays the image data, and a list of attribute information of the image data. In this case, when a user is the administrator, the user can select whether the electronic watermark is to be embedded into image data at the time of outputting the image data.

The operation processor 108 includes an embed select processor 121, an embedding-timing receiving unit 122, an area-selection receiving unit 123, and a mode input processor 124. The operation processor 108 performs processing corresponding to the operation performed by the user through the touch panel. For example, the operation processor 108 performs the processing according to a selection on whether an electronic watermark is to be embedded, embedding timing, an area into which the electronic watermark is to be embedded, a mode of inputting the image data, image data to be output form the storage unit 115.

Figure 3B:
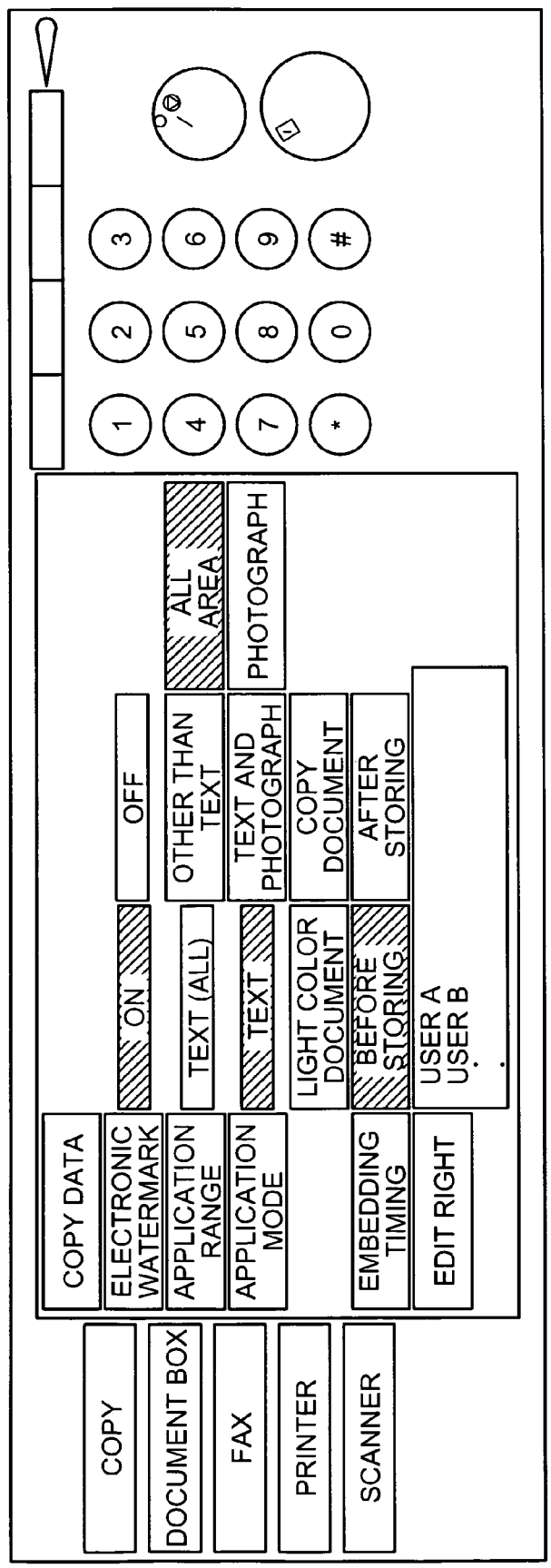
FIG. 3B is a schematic of a screen to input image data read by a scanner.

FIGS. 3A and 3B are schematics of a screen displayed on the touch panel to make a setting for an electronic watermark. The operation processor 108 inputs a setting made by the user though the touch panel. The screen examples shown in FIGS. 3A and 3B are displayed only when the administrator authenticating unit 112 authenticates the user as an administrator. Only the administrator has an authority to set for embedding an electronic watermark into the image data.

FIG. 3A is one example of a screen displayed on the touch panel to input image data from the personal computer 10. Whether to embed an electronic watermark is selected at an "electronic watermark" section shown on the screen. When it is set to embed the electronic watermark, the user next selects an application area and embedding timing. The application area can be selected from among "text", "other than text", and "all area" at an "application range" section. The embedding timing is set at an "embedding timing" section. The user selects whether the electronic watermark is to be embedded before the image data is stored or after the image data is stored. When the user selects the "text" at the "application range", the user can further select an area from a "whole text area", a "black text area", and a "non-black text area". Contents of the settings are stored as setting data in the storage unit 115. The input processor 101 described later uses the setting data at the time of inputting image data, and the embedding determining unit 109 also uses the setting data to determine whether the electronic watermark is to be embedded.

FIG. 3B is one example of a screen displayed on a touch panel to input image data read by the scanner 20. The screen example of the touch panel shown in FIG. 3B is different from the screen example of the touch panel shown in FIG. 3A in that "application mode" is displayed and that a user authenticated as an administrator can select the "application mode" at the time of carrying out an input. Quality of the image data can be set by making a selection in the "application mode".

When "photograph" is set as the application mode, an electronic watermark is not embedded into the image data. Thus, degradation of image quality due to an electronic watermark embedded can be prevented, and high-quality image data can be created. When the user sets the "photograph", information indicating that an electronic watermark is not embedded is displayed for the user for confirmation.

Referring back to FIG. 1, the embed select processor 121 inputs information, on whether the electronic watermark is to be embedded, which is set by the user in the "electronic watermark" section on the screens shown in FIGS. 3A and 3B.

The embedding-timing receiving unit 122 receives the embedding timing indicating whether an electronic watermark is embedded before storing the image data or after storing the image data. The embedding timing is selected by the user in the "embedding timing" section on the screen shown in FIGS. 3A and 3B. The embedding-timing receiving unit 122 carries out the input processing.

The area-selection receiving unit 123 receives an area in which an electronic watermark is embedded, which is selected by the user in the "application range" section on the screen shown in FIGS. 3A and 3B, and carries out the input processing. When "text" is selected as the area, the user can select an area further precisely from among the "whole text area", only the "black text area", and the "non-black text area".

Figure 4:
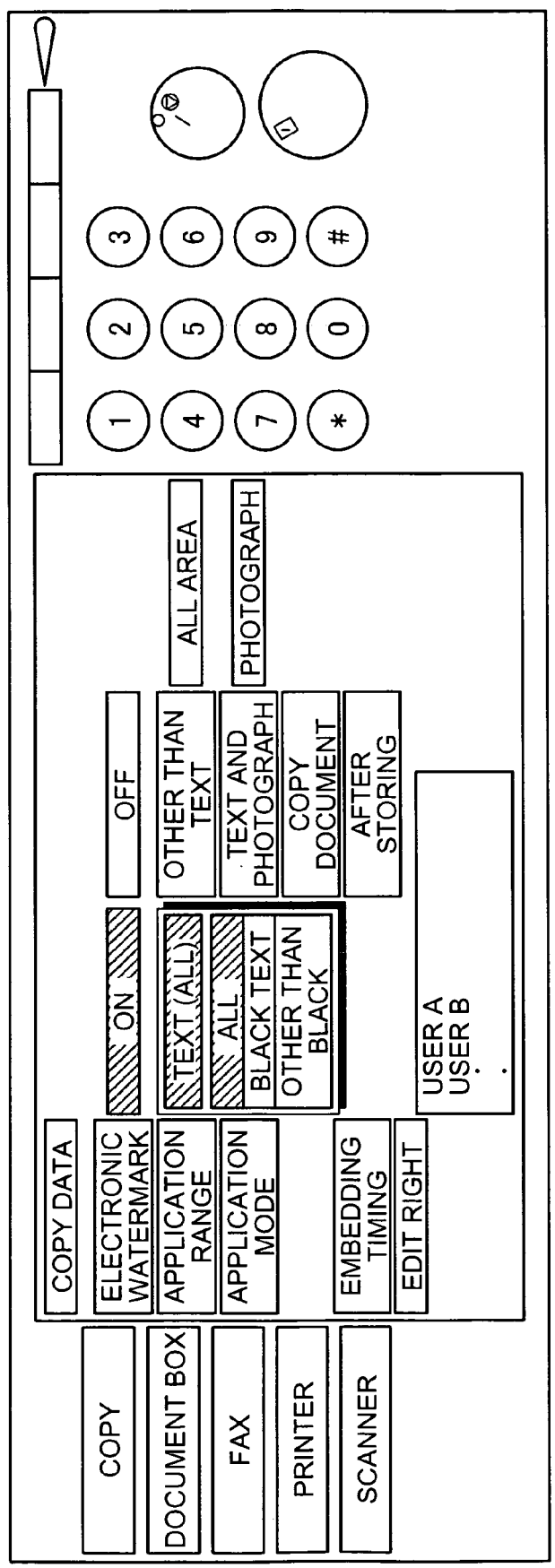
FIG. 4 is a schematic of a screen displayed when "text" is selected as an application area.

FIG. 4 is a schematic of a screen displayed on the touch panel when the "text" is selected in the "application range" section. As shown in FIG. 4, when the user selects the "text", a list of "all", "black text", and "other than black" is displayed. From the list, the user selects a text area in which an electronic watermark is embedded. For example, if the user does not need an electronic watermark in a mere decorative text using colors other than black, embedding an electronic watermark into only a document part described in black text is effective to prevent tampering.

Referring back to FIG. 1, the mode input processor 124 inputs information on settings that are necessary for inputting the document read by the scanner 20 as image data based. The information is set by the user in the "application mode" section on the screen shown in FIG. 3B.

The input processor 101 inputs image data from the personal computer 10, the scanner 20, or a FAX 30. When inputting document data read by the canner 20 from a paper medium, the input processor 101 inputs the image data based on a setting of the application mode in the setting data stored in the storage unit 115. For example, when the application mode is the "photograph", the input processor 101 inputs the image data so that high-quality image data is obtained. When the application mode is the "text", the input processor 101 inputs the image data by a binary process.

The embedding determining unit 109 determines whether an electronic watermark is embedded into input image data or into image data to be output (hereinafter, "output image data"). A different determination method is applied depending on whether the electronic watermark is embedded into the input image data or the output image data.

When an electronic watermark is to be embedded into input image data, the embedding determining unit 109 determines whether to embed the electronic watermark based on setting data in the storage unit 115. For example, when the setting data holds setting information that an electronic watermark is to be embedded and that the electronic watermark is to be embedded before storing the image data, the embedding determining unit 109 determines that the electronic watermark is to be embedded. On the other hand, when the setting data holds setting information that an electronic watermark is not to be embedded or that the electronic watermark is to be embedded after storing the image data, the embedding determining unit 109 determines that the electronic watermark is not to be embedded. When the application mode is set to the "photograph" for image data input from the scanner 20, the embedding determining unit 109 determines that the electronic watermark is not to be embedded into the image data. Accordingly, it becomes possible to determine whether an electronic watermark is embedded based on a set mode, thereby maintaining the quality of the mode.

When an electronic watermark is to be embedded before storing image data, the embedding unit 105 embeds the electronic watermark before the image data is stored in the storage unit 115. With this arrangement, even when the storage unit 115 is connected to another device, the image data obtained from the storage unit 115 in the other device has the electronic watermark already embedded. In other words, tampering can be detected even from image data that is obtained in an unauthorized manner.

When an electronic watermark is to be embedded after storing image data, the embedding unit 105 does not embed the electronic watermark at the time of storing the image data in the storage unit 115, but embeds the electronic watermark at the time of outputting the image data. At the time of outputting image data to other devices, a format of the data usually needs to be converted to other format that is suitable for transmission of the data. Due to conversion of the format, there is a possibility of dropping information if a normal electronic watermark is embedded in the data. In other words, when the embedding unit 105 embeds an electronic watermark after the conversion and before outputting the image data, the electronic watermark can be properly embedded at the time of transmitting the image data to other device.

When image data is to be output, the embedding determining unit 109 determines whether an electronic watermark is to be embedded into the image data referring to the image attribute table stored in the storage unit 115. In other words, the embedding determining unit 109 determines based on a value in the "watermark output" field corresponding to a file name of the image data in the image attribute table. When the value is "0", the embedding determining unit 109 determines that the electronic watermark is to be embedded into the image data. When the user changes the setting for the electronic watermark at the time of outputting the image data, the embedding determining unit 109 determines whether to embed the electronic watermark based on a new setting.

The determining unit 102 determines whether input image data is text data based on a pattern in each block of a predetermined size extracted from of the image data. The determining unit 102 determines all blocks that are determined as text as a text determination area, and determines other blocks as a non-text determination area. The determining unit 102 determines an area in which an electronic watermark is to be embedded from among these areas based on setting data. The determining unit 102 can identify a range of an area in which text is described in image data. Thus, it is possible to embed an electronic watermark in an intended area without setting a region in detail. The electronic watermark can be embedded in at least one of a text area and a picture area just by making a selection on the touch panel. Therefore, operability and convenience of the user are improved.

Figure 5:
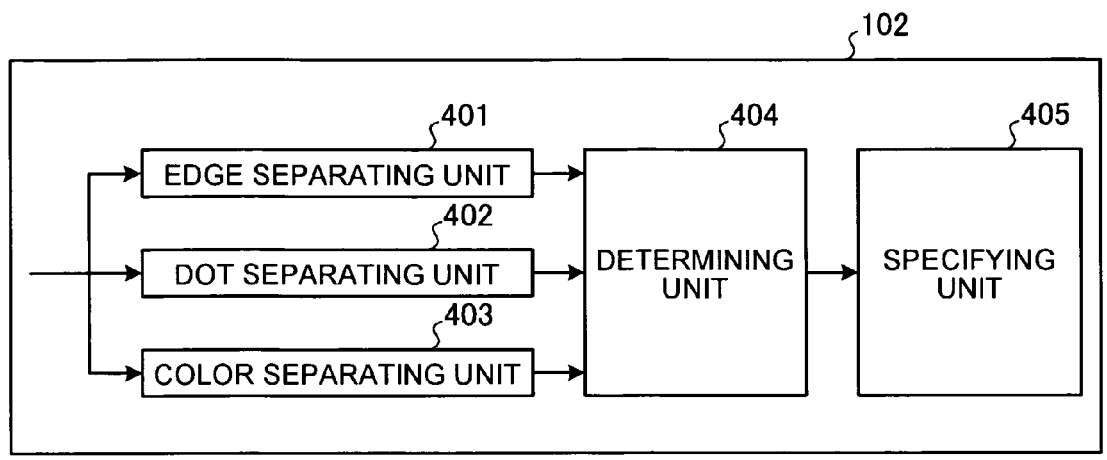
FIG. 5 is a block diagram of a determining unit in the apparatus shown in FIG. 1.

FIG. 5 is a block diagram of the determining unit 102. As shown in FIG. 5, the determining unit 102 includes an edge separating unit 401, a dot separating unit 402, a color separating unit 403, a determining unit 404, and a specifying unit 405. The edge separating unit 401 detects an edge of a text area in input image data, for each predetermined block of the input image data. The dot separating unit 402 detects a dotted area from the image data. The color separating unit 403 detects a colored part from the image data.

When the edge separating unit 401 detects an edge while the dot separating unit 402 does not detect a dotted area and the color separating unit 403 does not detect a colored part, the determining unit 404 determines that the block is a black text area. When the edge separating unit 401 detects an edge and the color separating unit 403 detects a colored part while the dot separating unit 402 does not detect a dotted area, the determining unit 404 determines that the block is a text area in a color other than black. For other detected patterns, the determining unit 404 determines that the block is other than text.

The specifying unit 405 specifies all blocks that are determined as black text as a black text determination area. The specifying unit 405 specifies all blocks that are determined as text in other colors than black by the determining unit 404 as a non-black text determination area. The specifying unit 405 specifies all blocks that are determined as non-text by the determining unit 404 as a non-text determination area. The specifying unit 405 specifies an area of a combination of the black text determination area and the non-black text determination area as a text determination area.

Because in the setting data, an area into which an electronic watermark is embedded is set to at least one of the black text determination area, the non-black text determination area, the determining unit 102 can determine the area based on the setting data. The determining unit 102 and the specifying unit 405 determine the area from among the text determination area, the non-text determination area, or the whole display area.

When an electronic watermark is to be embedded into image data at the time of inputting the image data, the determining unit 102 determines an area into which an electronic watermark is to be embedded based on the application range in the setting data stored in the storage unit 115. When an electronic watermark is to be embedded at the time of outputting image data, the determining unit 102 determines an area into which an electronic watermark is to be embedded based on information in the "application range" field in the image attribute table stored in the storage unit 115. When the user changes the application range at the time of outputting image data, the determining unit 102 determines an area into which an electronic watermark is to be embedded by giving priority to the changed setting. When selecting a text determination area, the determining unit 102 further determines at least one of the black text determination area and the non-black text determination area as an area into which an electronic watermark is to be embedded.

For example, when image data is to be output, the determining unit 102 obtains a value in the application range field in the image attribute table. When the value is "1", the determining unit determines that an electronic watermark is to be embedded into the whole display area of the image data. When the value is "2", the determining unit determines that an electronic watermark is to be embedded into the non-text determination area. When the value is "3", the determining unit determines that an electronic watermark is to be embedded into the text determination area. When the value is "4", the determining unit determines that an electronic watermark is to be embedded into the black text determination area. When the value is "5", the determining unit determines that an electronic watermark is to be embedded into the non-black text determination area. The setting data also includes the above values as the application ranges. Therefore, by obtaining the setting data, the determining unit 102 can specify an area into which an electronic watermark is to be embedded at the time of inputting the image data.

Referring back to FIG. 1, the compressing unit 103 compresses image data input from the scanner 20 or from the FAX 30. The compressing unit 103 compresses the image because the image data input by the scanner 20 has 256 gradations. If this image data is stored in the storage unit 115 without compression, a document image of just one page amount occupies a large amount of the image memory. In other words, by compressing the input image by the compressing unit 103, it becomes possible to effectively use a limited memory area of the storage unit 115.

When the embedding determining unit 109 determines that an electronic watermark is to be embedded, the embedding unit 105 embeds the electronic watermark into the area determined by the determining unit 102. According to the present embodiment, the embedding unit 105 embeds tampering detection information into image data as an electronic watermark. The tampering detection information is used to detect presence or absence of tampering based on destruction of embedded information when the image data is tampered. When the electronic watermark is embedded in the input image data, the embedding unit 105 outputs information indicating this fact to the attribute-information creating unit 113, and, at the same time, stores the image data with the electronic watermark embedded in the storage unit 115.

The attribute-information creating unit 113 includes a thumbnail creating unit 131, creates values indicating attribute data to be added to the image attribute table, and adds the data to the attribute table. In other words, the attribute-information creating unit 113 creates a value of the "data type" based on a format of the input image data, and creates a value of the "watermark embedding" based on whether the embedding unit 105 embeds the electronic watermark. Furthermore, the attribute-information creating unit 113 obtains a value of the "application range" from the setting data that is referred to at the time of inputting the data. The attribute-information creating unit 113 creates a value of the "watermark output" based on the information in the setting data on whether an electronic watermark is to be embedded and the information on whether the electronic watermark is to be embedded before or after storing the image data. The attribute-information creating unit 113 creates the "created date" based on the time when the input processor 101 inputs the image data. The values to be set to the respective fields are as shown in FIG. 2.

The attribute-information creating unit 113 sets "0" as a value of the "watermark output" when an electronic watermark is to be embedded after the image data is stored, and sets "1" as a value of the "watermark output" when an electronic watermark is not to be embedded. The attribute-information creating unit 113 also sets "2" as a value of the "watermark output" when an electronic watermark is to be embedded before the image data is stored.

The attribute-information creating unit 113 adds the created or obtained attribute data to the image attribute table stored in the storage unit 115, associating the attribute data with the file names of the input image data and the file names of the thumbnail created by the thumbnail creating unit 131.

The thumbnail creating unit 131 creates a thumbnail image of image data, and stores the created thumbnail image in the storage unit 115.

The tampering detector 106 detects tampering of image data in accordance with a tampering detection request input from the output processor 107, based on the embedded electronic watermark.

The output processor 107 outputs image data for which an output request is made. The output processor 107 outputs the image data to the personal computer 11 and a printer 21.

FIG. 6 is a schematic of a screen displayed on the touch panel when the user operates to output image data stored in the storage unit 115. As shown in FIG. 6, the screen on the touch panel displays a list of image data that can be output. The display processor 114 refers to the image attribute table to obtain information corresponding to the file name of image data, the "data type", the "watermark embedding", the "application range", and the "watermark output", and displays the screen shown in FIG. 6 for the user to visually confirm the contents. The operation processor 108 inputs a file name of image data selected by the user, and outputs attribute data corresponding to the image data selected in the image attribute table, to the output processor 107.

At the time of outputting the image data, when an electronic watermark is not embedded in the image data, the user that is authenticated as an administrator by the administrator authenticating unit 112 can change an item of the "electronic watermark output" shown in FIG. 6. In other words, the user can select again, at the time of outputting the image data, whether to embed the electronic watermark and an area into which the electronic watermark is embedded. When changes are made in settings in these items, the operation processor 108 inputs changed settings, and outputs the changed setting to the embedding determining unit 109 or an area selecting unit 104.

The output processor 107 confirms whether an electronic watermark is embedded based on information in the "watermark embedding" field. When it is determined that an electronic watermark is embedded in the image data, the output processor 107 outputs a request for detecting tampering of the output image data, to the tampering detector 106. When tampering is not detected, the tampering detector 106 outputs the image data to the output processor 107.

When it is determined that an electronic watermark is not embedded in the image data, the output processor 107 outputs information indicating this fact to the embedding determining unit 109. The embedding determining unit 109 determines whether to embed an electronic watermark into the image data. When the embedding determining unit 109 determines to embed a electronic watermark into the image data, the embedding unit 105 embeds the electronic watermark into the image data. The output processor 107 outputs the image data with the electronic watermark embedded. Before the output processor 107 outputs the image data, the format converting unit 111 converts a format of the image data as necessary.

Figure 7:
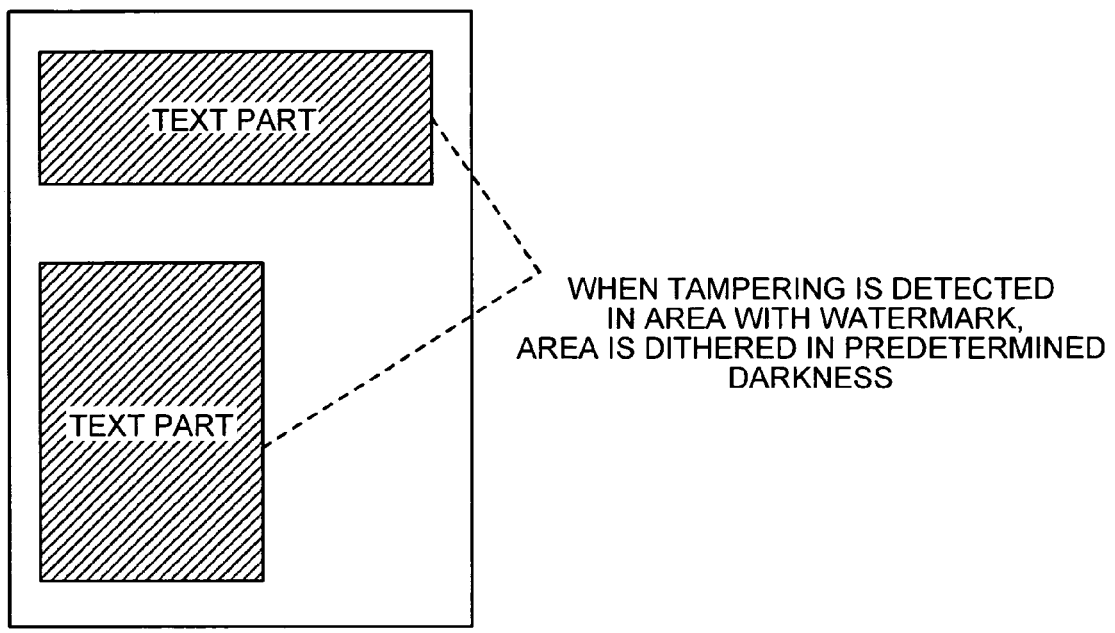
FIG. 7 is a schematic of image output from a printer when a tampering is detected.

FIG. 7 is a schematic of image data controlled by the output processor 107 to be output from the printer 21 when the tampering detector 106 detects tampering. As shown in FIG. 7, the output processor 107 dithers the area in which the tampering detector 106 detects tampering, in a predetermined darkness, so that the tampered area cannot be visually recognized.

When other device requests for output of image data, the format converting unit 111 converts the format of the image data as necessary. For example, when other device requests for output of image data input by a scanner, the format converting unit 111 converts the format of the image data into, for example, the PDF format that is recognizable in the other device. With this arrangement, the other device can refer to the image data regardless of the format of the image data stored in the storage unit 115.

The administrator authenticating unit 112 authenticates that a user is an administrator of the apparatus 100. The administrator authenticating unit 112 authenticates that the user is an administrator when a user ID and a password input by the user from the operation processor 108 coincide with the ID and the password held in the administrator holding table stored in the storage unit 115. Only when the user is authenticated as an administrator, the user can select whether to embed the electronic watermark into the image data, whether to embed the electronic watermark before or after the image data is stored in the storage unit 115, and an area in which the electronic watermark is to be embedded. With this arrangement, it becomes possible to prevent a malicious user from changing the setting to determine whether to embed the electronic watermark, an area in which the electronic watermark is embedded, and timing at which the electronic watermark is embedded. Consequently, it is possible to prevent image data from being output in such a condition that an area that should be protected from tampering can be tampered. Thus, it is possible to smoothly change the setting for the area in which the electronic watermark is embedded if the user is the administrator, thereby improving convenience in operation while securing safety.

The administrator setting unit 110 adds a user ID and a password of other users input by the administrator through the operation processor 108 to the administrator holding table by setting the other user as an administrator.

Accordingly, the administrator setting unit 110 enables an authorized user to set other optional user as an administrator. Consequently, safety can be secured because only the administrator can make a change in the settings for an electronic watermark. Furthermore, because other user can be set as an administrator, convenience is improved.

Figure 8:
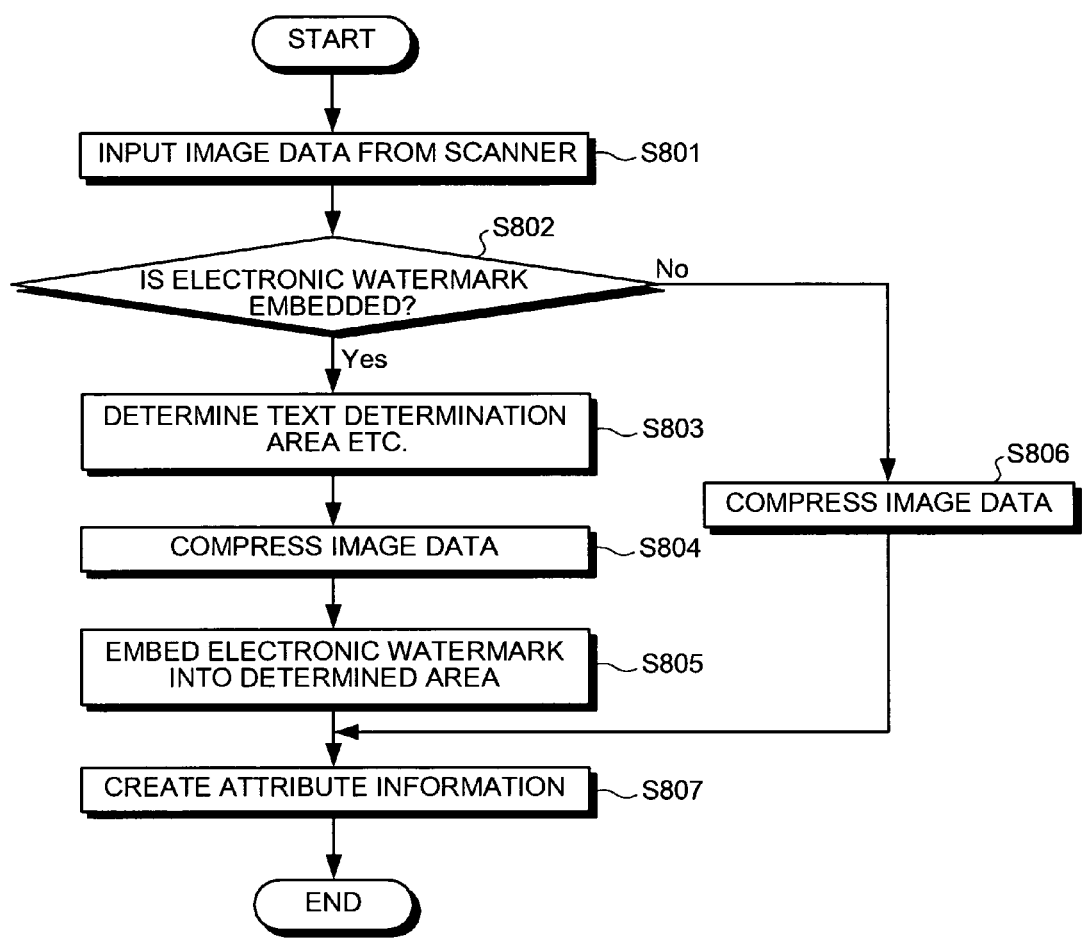
FIG. 8 is a flowchart of a process for storing image data input from a scanner in the storage unit.

FIG. 8 is a flowchart of a process for storing image data input from the scanner 20 in the storage unit 115. The input processor 101 inputs image data read by the scanner 20 (step S801). The input processor 101 obtains the setting data set by the administrator from the storage unit 115, and inputs the image data based on the setting data.

The embedding determining unit 109 determines whether to embed the electronic watermark into the input image data (step S802). The embedding determining unit 109 determines whether the electronic watermark in the setting data stored in the storage unit 115 is to be embedded and whether the electronic watermark is to be embedded at the set time of embedding the electronic watermark, based on the embedding timing. In other words, the embedding determining unit 109 determines that the electronic watermark is to be embedded into the image data when the data is set such that the electronic watermark held in the setting data is to be embedded and when the electronic watermark is to be embedded before storing the image data in the storage unit 115. The embedding determining unit 109 determines that the electronic watermark is not to be embedded into the image data when the data is set such that the electronic watermark is not to be embedded or when the electronic watermark is to be embedded after storing the image data into the storage unit 115. The embedding determining unit 109 determines that the electronic watermark is not to be embedded into the image data when the application mode held in the setting data is the "photograph".

When the embedding determining unit 109 determines that the electronic watermark is to be embedded into the image data ("YES" at step S802), the determining unit 102 determines a text determination area and a non-text determination area in the image data, and determines an area in which the electronic watermark is to be embedded based on the application range stored in the setting data, from the specified areas (step S803). For the text determination area, the determining unit 102 further determines the area from among a black text determination area and a non-black text determination area to embed the electronic watermark.

The compressing unit 103 compresses the image data (step S804). The embedding unit 105 embeds the electronic watermark into the area selected by the area selecting unit 104, and stores the image data with the electronic watermark embedded, in the storage unit 115 (step S805). The electronic watermark to be embedded is the tampering detection information.

When the embedding determining unit 109 determines that the electronic watermark is not to be embedded into the image data ("NO" at step S802), the compressing unit 103 compresses the image data and then stores the image data in the storage unit 115 (step S806).

The attribute-information creating unit 113 adds the information on whether the electronic watermark is embedded by the embedding unit 105 and the information obtained from the setting data to the image attribute table associating with the file name of stored image data (step S807). In this case, the thumbnail creating unit 131 creates a thumbnail image of the stored image data. The attribute-information creating unit 113 also adds the file name of created thumbnail image to the image attribute table associating this file name with the file name of the image data.

The above processing is one example of a process for embedding an electronic watermark into the image data read by the scanner 20 and for storing the image data, and the process is not limited to this processing.

Figure 9:
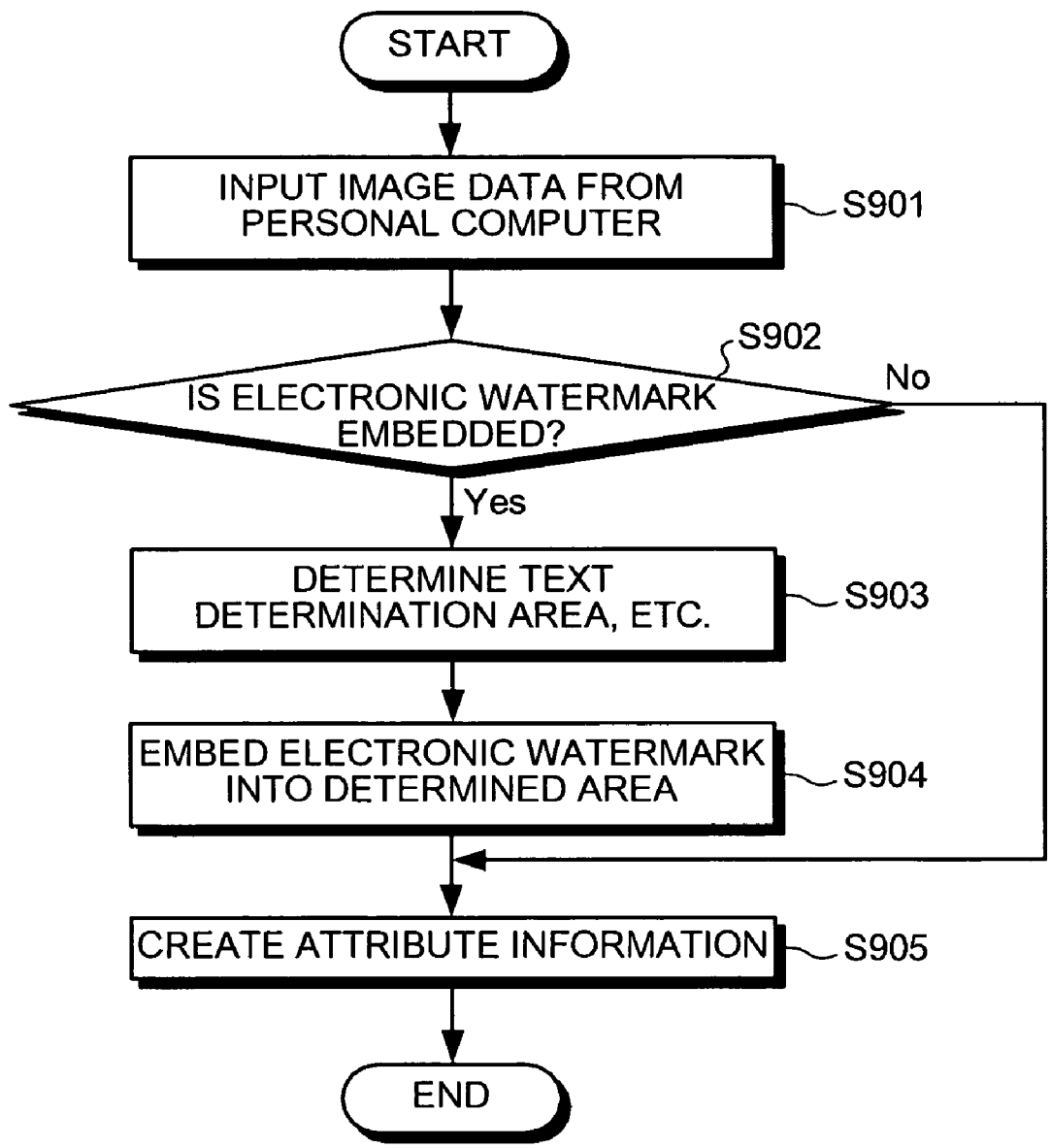
FIG. 9 is a flowchart of a process for storing image data input from a personal computer in the storage unit.

FIG. 9 is a flowchart of a process for storing image data input by the personal computer 10 in the storage unit 115. The input processor 101 inputs image data transmitted from the personal computer 10 (step S901). It is not necessary to obtain setting data from the storage unit 115 unlike the process shown in FIG. 8.

The embedding determining unit 109 determines whether to embed an electronic watermark into the image data in a similar manner as that in the process shown in FIG. 8. When an electronic watermark is to be embedded into the image data, the embedding determining unit 109 specifies an area such as a text determination area, determines an area into which the electronic watermark is to be embedded based on the specified area, and embeds the electronic watermark into this area. The embedding determining unit 109 adds a file name of the image data with the electronic watermark embedded, and attribute data of the image data, to the image attribute table associating with each other (steps S902 to S905). In other words, processing at step S902 to S905 shown in FIG. 9 is performed in a similar manner as the processing at step S804 and step S807 in FIG. 8, except compression performed by the compressing unit 103.

Because the image data input from the personal computer 10 is not 256 gradation data like the image data input from the scanner 20, the image data input from the personal computer 10 is not particularly required to be compressed.

The above processing is one example of the process for embedding an electronic watermark into the image data transmitted from the personal computer 10 and for storing the image data, and the process is not limited to this processing.

Based on the processes shown in FIGS. 8 and 9, an electronic watermark can be embedded into a selected area such as a text determination area of the input image data before the image data is stored in the storage unit 115. By embedding of the electronic watermark into the image data before the image data is stored in the storage unit, tampering of the image data can be detected, even when the image data is illegally output from the storage unit 115 when, for example, only the storage unit 115 is stolen.

FIG. 10 is a flowchart of a process for outputting image data stored in the storage unit 115. The operation processor 108 receives image data to be output that is selected from the list of the image data displayed on the touch panel to inputs the data (step S1001). The screen example shown in FIG. 6 is displayed on the touch panel. The operation processor 108 outputs information of selected image data to the embedding determining unit 109. When the administrator inputs a changed setting on the touch panel, the changed setting is also input.

The embedding determining unit 109 determines whether to embed an electronic watermark in the image data based on information in the "watermark output" field in the image attribute table corresponding to the image data (step S1002). For example, when the value in the "watermark output" field is "0", the embedding determining unit 109 determines that the electronic watermark is to be embedded into image data. When the value of the "watermark output" field is "1" or "2", the embedding determining unit 109 determines that the electronic watermark is not to be embedded into image data. When the operation processor 108 inputs information that the setting for the "electronic watermark output" is changed, the embedding determining unit 109 determines whether the electronic watermark is to be embedded into image data based on changed setting. When the application mode is the "photograph", the embedding determining unit 109 determines that the electronic watermark is not to be embedded into the image data.

When the embedding determining unit 109 determines that the electronic watermark is to be embedded into the image data ("YES" at step S1002), the determining unit 102 specifies a text determination area and a non-text determination area in the image data. The determining unit 102 determines an area into which the electronic watermark is to be embedded based on the "application range" corresponding to the output image data in the image attribute table, from among the specified areas (step S1003). When the administrator changes the setting for the "application range" on the touch panel, the determining unit 102 determines an area into which the electronic watermark is to be embedded based on changed setting.

The format converting unit 111 converts a format of the image data (step S1004). The format converting unit 111 selects a suitable format corresponding to a destination to which the image data is output. For example, when the image data is to be output to the personal computer 10, the data format is converted to the BMP or the PDF format. When the image data is to be output to the printer 21, the data format is converted to a format of copy data or the like in which the printer 21 can output the image data.

The embedding unit 105 embeds an electronic watermark into an area of the image data determined by the determining unit 102 (step S1005). The electronic watermark is the tampering detection information.

When the embedding determining unit 109 determines that the electronic watermark is not to be embedded into the image data ("NO" at step S1002), the format converting unit 111 converts the format of the image data (step S1006).

The output processor 107 outputs the image data (step S1007). The image data is output to the personal computer 11 or the printer 21. The image data is output to a destination that is set by the user on the touch panel.

Thus, it becomes possible to embed an electronic watermark into the image data stored in the storage unit 115 before outputting the image data. Consequently, the electronic watermark can be embedded into the output image data regardless of whether the format is converted. When the user changes the data setting again at the time of outputting the image data, the electronic watermark can be embedded according to a request of the user. Accordingly, information in the area to be protected can be properly protected. The above processing is one example of the process of outputting the image data stored in the storage unit 115, and the process is not limited to this processing.

FIG. 11 is a block diagram of a hardware configuration of the apparatus 100. As shown in FIG. 11, the apparatus 100 includes an engine and a printer controller connected to each other through a general-purpose bus 1115.

The engine includes a FAX controller 1101, a reading unit 1102, a scanner corrector 1103, a compressor 1104, an engine controller 1105, a print corrector 1106, an expander 1107, an imaging unit 1108, and a generic audio-video distribution (GAVD) 1109. The scanner corrector 1103 includes a determining unit 1221. The determining unit 1221 has a function similar to that of the determining unit 102, and performs determination of an area before the compressor 1104 compresses image data.

The printer controller includes a network interface controller (NIC) 1110, a printer controller 1111, a hard disk drive (HDD) 1112, a memory 1113, and an image-format converting unit 1114. The printer controller 1111 includes an embedding unit 1222. The embedding unit 1222 has a function similar to that of the embedding unit 105. The embedding unit 1222 embeds an electronic watermark into image data before the image data is stored in the HDD, embeds an electronic watermark before image data is output to the expander 1107 to be printed, or embeds an electronic watermark after the image-format converting unit 1114 converts the format of the image data to transmit the data to an external personal computer.

The electronic watermark embedding device can be provided in an image forming apparatus such as multi-function peripherals (MFP) having the above configuration as described above, or can be provided in other device. For example, when an image reading unit such as a scanner has the above configuration, an electronic watermark can be embedded into the image data obtained by reading a document.

The apparatus for embedding an electronic watermark is not limited to be provided in an image forming apparatus or an image processor such as an image reading unit. For example, the function of the electronic watermark embedding device can be achieved by executing a computer program for embedding an electronic watermark with a personal computer. As explained above, the apparatus may be configured separately from the image processor. In this case, a scanner or a printer can be connected to a personal computer via a network, and an electronic watermark can be embedded into image data input from the scanner or the printer. Alternatively, an electronic watermark can be embedded into image data input via a medium such as a compact disk (CD).

The computer program executed by the apparatus 100 according to the present embodiment is provided being recorded in, for example, a read-only memory (ROM) in advance.

The computer program executed by the apparatus 100 according to the present embodiment may be also provided by recording the computer program on a computer-readable recording medium such as a compact disk read-only memory (CD-ROM), a flexible disk (FD), a compact disk recordable (CD-R), and a digital versatile disk (DVD) in an installable format or an executable format.

The computer program executed by the apparatus 100 according to the present embodiment may be also stored into a computer connected to a network such as the Internet. The computer program can be downloaded via the network. The computer program executed by the apparatus 100 according to the present embodiment may also be provided or distributed via a network such as the Internet.

The computer program executed by the apparatus 100 according to the present embodiment has a module configuration including the above-described units, for example, the input processor 101, the determining unit 102, the compressing unit 103, the embedding unit 105, the tampering detector 106, the output processor 107, the operation processor 108, the embedding determining unit 109, the administrator setting unit 110, the format converting unit 111, the administrator authenticating unit 112, the attribute-information creating unit 113, and the display processor 114. In actual hardware, a central processing unit (CPU) reads the computer program from the ROM to execute the computer program. With this arrangement, the above units are loaded onto a main storage. Thus, functions of the input processor 101, the determining unit 102, the compressing unit 103, the embedding unit 105, the tampering detector 106, the output processor 107, the operation processor 108, the embedding determining unit 109, the administrator setting unit 110, the format converting unit 111, the administrator authenticating unit 112, the attribute-information creating unit 113, and the display processor 114 are achieved on the main storage.

The apparatus 100 according to the present embodiment determines an area into which an electronic watermark is to be embedded, and embeds the electronic watermark into the determined area. Thus, tampering of the image data can be prevented or an unauthorized access to the image data by a third party can be prevented in only a determined area, and changes of the image data in other areas can be permitted. In other words, it is possible to protect only a specific area of the image data, which is an area that the user desires to protect from being tampered. It is also possible to avoid tampering of the image data in at least one of the text determination area and the non-text determination area. Because an electronic watermark is not embedded in an area in which tampering does not need to be detected, it is possible to improve convenience because changes can be freely made in this area.

In the apparatus 100 according to the present embodiment, by setting the embedding timing to after the image data is stored in the storage unit, it is possible to properly embed the electronic watermark even when the format of the image data is to be converted at the time of outputting the image data. Therefore, tampering of the image data can be properly prevented. Moreover, by setting the embedding timing to before the image data is stored in the storage unit, it is possible to prevent tampering of the image data even when the image data stored in the storage unit 115 is illegally output.

Furthermore, by setting the application mode, it is possible to determine whether to embed an electronic watermark into the image data. Therefore, quality of the image data can be maintained suitably to selected application mode.

While in the present embodiment, a case in which a specified area is the text determination area or the non-text determination area has been explained, the present invention is not limited to this case. For example, the area may be an area in which image characteristics can be recognized based on a pattern extracted from the image data, such as a dotted area or a non-dotted area.

While in the present embodiment, a case in which an electronic watermark to be embedded into image data as tampering detection information has been explained, the present invention is not limited to this case. For example, secret information that can be read even when tampering is carried out can be embedded into a selected area as an electronic watermark. With this arrangement, even when only a protection area is cut out, secret information can be obtained, thereby preventing an unauthorized access by a third party.

While in the present embodiment, a case in which only a user that has a predetermined authority can make determination to embed an electronic watermark into the image data has been explained, the present invention is not limited to this case. Alternatively, an optional user can be permitted to embed an electronic watermark into image data.

While in the present embodiment, a case in which a text determination area is specified regardless of a format of image data, the present invention is not limited to this case. Alternatively, when the format of the image data is the BMP, an electronic watermark can be embedded into all areas without specifying an area, and when the image data is PDF data or scan data, an electronic watermark can be embedded into only a selected area by specifying a text area.

An image forming apparatus 1200 according to a second embodiment of the present invention has a configuration including the apparatus 100, the scanner 20, the FAX device 30, and printer 21 integrated together. Because the image forming apparatus 1200 has the same configuration as that of the apparatus 100 in the first embodiment, explanation of this configuration is omitted. A process performed by the image forming apparatus 1200 is also similar to that explained in the first embodiment, and, therefore, this explanation is omitted.

With the above configuration, the image forming apparatus 1200 selects of an area of image data into which an electronic watermark is to be embedded, and embeds the electronic watermark into selected area, thereby preventing the selected area of the image data from being tampered and preventing an unauthorized access by a third party. The image forming apparatus 1200 can also prevent tampering of image data in at least one of the text determination area and the non-text determination area. An electronic watermark is not embedded into an area in which tampering does not need to be detected. Therefore, it is possible to improve convenience because changes can be freely made in this area of the image data.

According to the present invention, tampering of the data can be prevented or an unauthorized access by a third party can be prevented in only the predetermined area, and changes of data in other areas can be permitted.

Moreover, according to the present invention, tampering of the data can be prevented or an unauthorized access by a third party can be prevented in only the predetermined area desired by a user, and changes of data in other areas can be permitted.

Furthermore, according to the present invention, an area in which tampering is to be prevented can be determined precisely, thereby properly protecting the area in which a user wishes to prevent tampering of the image data, and permitting changes in the data in other areas.

Moreover, according to the present invention, it is possible to prevent a malicious user from changing the data in the predetermined area of image data, thereby preventing image information from being output in a condition in which an area to be protected can be tampered.

Furthermore, according to the present invention, it is possible to improve convenience in which an authorized user can be set while maintaining security.

Moreover, according to the present invention, when a predetermined processing needs to be carried out to image data at the time of outputting the image data, an electronic watermark can be embedded into the image data after the predetermined processing is performed on the image data, thereby preventing tampering of the image data.

Furthermore, according to the present invention, even when the image data stored in the image storage unit is output illegally, tampering can be prevented.

Moreover, according to the present invention, an electronic watermark is embedded based on a condition set by a user, thereby improving convenience.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for embedding an electronic watermark comprising:
   a determining unit configured to determine whether a specified area is present in an image;
   an embedding unit configured to embed an electronic watermark into the specified area;
   a storage unit configured to store image data of the image;
   an output unit configured to output the stored image data;
   a displaying unit configured to display a first embedding timing option and a second embedding timing option, the first embedding timing option being before storing the image data in the storage unit, the second embedding timing option being after storing the image data in the storage unit and before outputting the image data from the storage unit; and
   a timing specifying unit configured to specify a timing at which the embedding unit is to embed the electronic watermark according to either the first embedding timing option or the second embedding timing option based on a first selection by a user.

2. The apparatus according to claim 1, further comprising:
   a specifying unit configured to specify the specified area based on a second selection made by the user.

3. The apparatus according to claim 1, further comprising:
   a text/non-text detecting unit configured to detect a text area and a non-text area in the image, wherein the specified area is at least one of the text area and the non-text area.

4. The apparatus according to claim 3, wherein the text/non-text detecting unit is configured to detect a black text area and a non-black text area in the text area, and the text area of the specified area is at least one of the black text area and the non-black text area.

5. The apparatus according to claim 2, further comprising:
   a verifying unit configured to verify whether the user is an authorized user to make the first and second selections, wherein the specifying unit is activated only when the verifying unit verifies that the user is an authorized user.

6. The apparatus according to claim 5, further comprising:
   an authority setting unit configured to set a second user as the authorized user based on authentication by another authorized user, wherein the verifying unit is configured to verify that the second user is the authorized user.

7. The apparatus according to claim 1, further comprising:
   a setting unit configured to set a condition for embedding the electronic watermark, wherein the embedding unit is configured to embed the electronic watermark when the condition is satisfied.

8. The apparatus according to claim 7, further comprising:
   a changing unit configured to change the condition, wherein the embedding unit embeds the electronic watermark based on the changed condition.

9. A method of embedding an electronic watermark comprising:
   determining, by a determining unit, whether a specified area is present in an image;
   embedding, by an embedding unit, an electronic watermark into the specified area;
   storing, by a storage unit, image data of the image;
   outputting, by an output unit, the stored image data;
   displaying, by a displaying unit, a first embedding timing option and a second embedding timing option, the first embedding timing option being before storing the image in the storage unit, the second embedding timing option being after storing the image data in the storage unit and before outputting the image data from the storage unit; and
   specifying, by a timing specifying unit, a timing at which the electronic watermark is to be embedded according to either the first embedding timing option or the second embedding timing option based on a first selection by a user.

10. The method according to claim 9, further comprising:
    specifying, by a specifying unit, the specified area based on a second selection made by the user.

11. The method according to claim 9, further comprising:
detecting, by a text/non-text detecting unit, a text area and a non-text area in the image, wherein the specified area is at least one of the text area and the non-text area.

12. The method according to claim 11, wherein the detecting the text area and the non-text area includes detecting a black text area and a non-black text area in the text area, and the text area of the specified area is at least one of the black text area and the non-black text area.

13. The method according to claim 10, further comprising:
verifying, by a verifying unit, whether the user is an authorized user to make the first and second selections, wherein the specifying is performed only when the user is verified as an authorized user at the verifying.

14. The method according to claim 13, further comprising:
setting, by an authority setting unit, a second user as the authorized user based on authentication by another authorized user, wherein the verifying includes verifying that the second user is the authorized user.

15. The method according to claim 9, further comprising:
setting, by a setting unit, a condition for embedding the electronic watermark, wherein the embedding includes embedding the electronic watermark when the condition is satisfied.

16. The method according to claim 15, further comprising:
changing, by a changing unit, the condition, wherein the embedding includes embedding the electronic watermark based on the changed condition.

17. A computer-readable recording medium configured to store a computer program for embedding an electronic watermark, the computer program making a computer execute:
determining whether a specified area is present in an image;
embedding an electronic watermark into the specified area;
storing image data of the image in a storage unit;
outputting the stored image data;
displaying a first embedding timing option and a second embedding timing option, the first embedding timing option being before storing the image in the storage unit, the second embedding timing option being after storing the image data in the storage unit and before outputting the image data from the storage unit; and
specifying a timing at which the electronic watermark is to be embedded according to either the first embedding timing option or the second embedding timing option based on a selection by a user.

18. The apparatus of claim 1, wherein the storage unit is further configured to store setting data, the setting data including the embedding timing and the specified area in which the electronic watermark is to be embedded in the image data.

19. The apparatus of claim 18, further comprising:
an output unit configured to output the image data stored in the storage unit according to the embedding timing.

* * * * *